United States Patent [19]

Chamberlin

[11] Patent Number: 4,904,844
[45] Date of Patent: Feb. 27, 1990

[54] REMOTELY OPERATED WINDSHIELD DEFROST

[76] Inventor: Dale L. Chamberlin, 5977-1 Meadowcreek Dr., Milford, Ohio 45150

[21] Appl. No.: 335,882

[22] Filed: Apr. 10, 1989

[51] Int. Cl.$^4$ ................................................ B60S 1/54
[52] U.S. Cl. ..................................... 219/203; 98/2.09
[58] Field of Search ........................... 98/2.09; 219/203

[56] References Cited

U.S. PATENT DOCUMENTS

| | | | |
|---|---|---|---|
| 1,995,769 | 3/1935 | Fiege | 219/203 |
| 2,121,753 | 6/1938 | Corwell, Jr. | 219/203 X |
| 3,026,401 | 3/1962 | Cheviron | 219/203 |
| 4,004,126 | 1/1977 | Boaz | 219/203 |
| 4,350,287 | 9/1982 | Richards | 219/203 X |

FOREIGN PATENT DOCUMENTS

WO79/01148 12/1979 PCT Int'l Appl. ................ 219/203

Primary Examiner—Harold Joyce

[57] ABSTRACT

A remotely-operated vehicle windshield defrost system having the capability of being initiated before the driver enters the vehicle, e.g. while he is having breakfast before leaving for work. The windshield can thus be essentially frost-free at the moment the vehicle enters traffic; there is no delay, as with conventional defrost systems which depend on the engine warming up before the defrost action can begin.

2 Claims, 1 Drawing Sheet

REMOTELY OPERATED WINDSHIELD DEFROST

BACKGROUND AND SUMMARY OF THE INVENTION

Present day automotive vehicles are equipped with built-in windshield defrosters. In most cases the defroster includes a hot water coil located in an air duct that leads to a small blower. Air flowing across the coil is directed by the blower against the windshield to achieve a defrost action.

At initial start-up of the engine the defroster coil is in an unheated condition, such that the defrost action does not begin immediately. The engine must be run for several minutes before any defrosting effect begins to take place.

U.S. Pat. No. 4,004,126 to P. Boaz represents one attempt at eliminating the time lag between engine start-up and initiation of a windshield defrost action. In the Boaz patented arrangement an electric resistance heater is incorporated into the windshield. A switch on the vehicle dashboard is actuable to energize the resistance heater and a small blower located below (within) the dashboard; the vehicle battery is used as the power source, such that the driver can initiate a defrost action immediately on entering the vehicle.

The present invention is directed to an arrangement that enables the driver to start a windshield defrost action before he enters the vehicle, e.g. five or ten minutes before entering the vehicle.

The contemplated system involves the use of a portable radio transmitter and radio receiver, of the type that is commonly used to remotely open and close garage doors. The radio receiver will be located in the vehicle for actuating a blower-heater unit located near the vehicle windshield. The radio transmitter will be carried by the owner of the vehicle.

In a typical situation the owner will depress a button on the transmitter housing from some point in his residence, e.g. from the bedroom or breakfast room a short time before he wishes to use the vehicle to go to work, etc. The transmitter will deliver a signal through the atmosphere to the receiver in the vehicle, whereupon the blower-heater unit will be energized to immediately begin a defrost action.

The system is preferably such that the person can shut off the blower-heater unit, either by depressing the button on the transmitter or by operating a manual switch located on the blower-heater unit.

The system can be a "built-in" system wherein the blower-heater unit forms a permanent part of the vehicle. However, more preferably the system is a "portable" system, wherein the blower-heater unit can be manually transported to or from the vehicle. A portable system has the advantage that it can be sold in the aftermarket for use with pre-existing vehicles; the owner can use it with different vehicles.

THE DRAWINGS

DESCRIPTION OF A PREFERRED EMBODIMENT OF THE INVENTION

Figure 1:
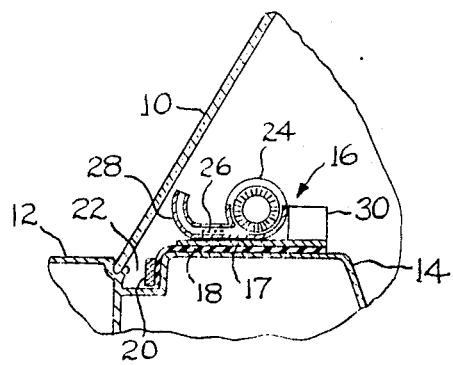
FIG. 1 is a fragmentary sectional view of a vehicle having a defrost system of the invention installed therein.

FIG. 1 shows a conventional automotive vehicle (e.g. car, truck, van, bus) having a windshield 10, hood 12 and dashboard 14. Removably disposed on dashboard 14 is a manually movable device 16 constructed according to this invention.

Device 16 comprises a flat plate 17 having a deformable rubber pad 18 seatable on the dashboard surface so that the weight of the device causes the pad to grip the dashboard surface. An elongated bar 20 is attached to the front edge of pad 18 for disposition in a channel 22 that commonly extends along the dashboard at the lower edge of windshield 10. The componentry is designed to achieve a stable vibration-free disposition of device 16 while it is operating to defrost windshield 10. When the device is inactive it can be readily picked up and moved to some other location.

Portable device 16 includes a motor-operated blower 24, electrical heating coil 26 located in the discharge passage 28 of the blower, and a power pack 30. Blower 24 can be of conventional construction, e.g. a cross flow blower of the type shown in U.S. Pat. 3,177,794 to N. Laing. The blower discharge passage can be curved upwardly as shown, to direct heated air upwardly along the windshield surface. Blower 24 and power pack 30 are both mounted on the upper face of plate 17.

Figure 2:
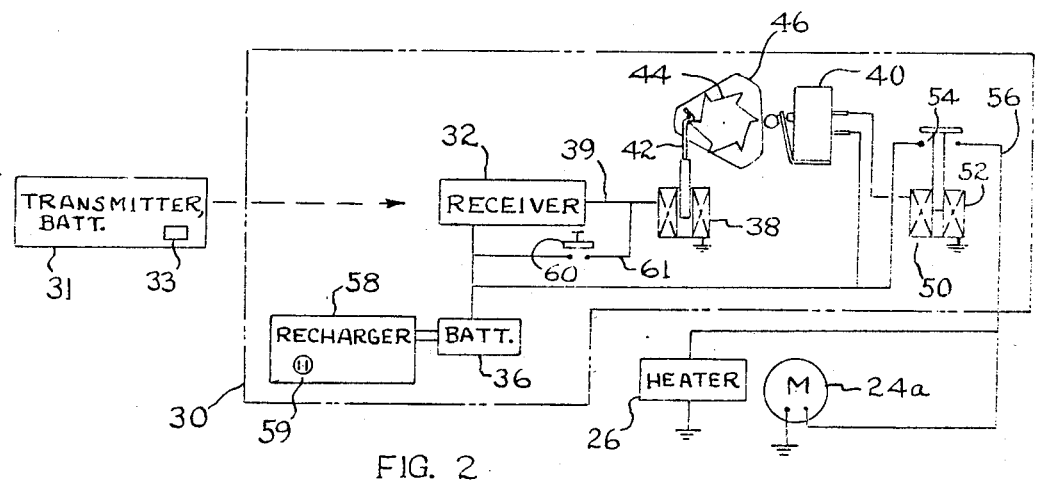
FIG. 2 is a schematic diagram of electric circuitry that can be used in practice of the invention.

FIG. 2 shows electrical features of power pack 30, encompassed within the dashed lines. In FIG. 2 the blower motor is referenced by numeral 24a. A portable hand-held radio transmitter 31 is used to remotely trigger a radio receiver 32 located as part of power pack 30. A push button 33 on the transmitter is depressed to cause a radio signal to be delivered to receiver 32; the receiver is connected to a battery 36, whereby the receiver delivers a short duration electrical pulse through line 39 to a coil 38.

Coil 38 constitutes part of a pulse-responsive controller that is used to control the "on" or "off" condition of snap action switch means 40. The controller also includes a pawl 42, rotary ratchet 44, and a rotary cam 46 attached to the ratchet. Delivery of a pulse from line 39 through coil 38 causes pawl 42 to be drawn downwardly for thereby indexing ratchet 44 one increment. Rotary cam 46 is designed to actuate switch means 40 to its "on" position during alternative pulses; during the intervening pulses the switch means 40 is actuated to its "off" position.

In an overall sense, the system operates so that when the transmitter button 33 is depressed, switch means 40 assumes one of its conditions, e.g. the "on" condition. During the next depression of transmitter button 33, the switch means will go to its other position, e.g. the "off" condition. The system will repeat, according as the person wishes to start or stop the associated blower-heater unit.

Switch means 40 is shown connected to the blower-heater unit via a relay 50. Thus, when the switch means is on relay coil 52 will be energized to close relay contacts 54, thereby energizing the blower and heater through line 56. The relay is considered as optional.

The system preferably includes a momentary switch 60 arranged in a line 61 between battery 36 and coil 38; switch 60 is in electrical parallelism with receiver 32, such that the controller (components 38, 42, 44 and 46) can be operated either by the receiver or by switch 60. Thus, the owner (driver) can turn the blower-heater unit off or on, either remotely (with transmitter 31) or while seated in the vehicle (with switch 58). The owner can leave the transmitter in his residence if he so desires.

The drawings show portable device 16 located on the vehicle dashboard. Within the broader aspects of the invention, the device can have other locations, e.g. suspended from the vehicle interior roof surface. The blower-heater unit can have various different configurations while still performing its function.

After repeated defrost actions battery 36 will be in a run down (discharged) condition. Therefore, the power pack 30 is preferably constructed to include a battery recharger 58 having an electrical receptacle 59 adapted to connect with any household electrical outlet via a non-illustrated extension cord, not shown.

I claim:

1. A remotely-operated automotive vehicle windshield defrost system comprising:

a deformable pad (18) positionable on a vehicle dashboard to exert a gripper force thereon, a bar (20) attached to said bar for placement in a channel that extends along the lower edge of the vehicle windshield, whereby the pad is removably mounted on the vehicle dashboard;

a blower and electric resistance heater unit located on said pad in near proximity to the vehicle windshield for blowing heated air thereagainst;

a portable radio transmitter adapted to be carried by a person remote from the vehicle;

a power pack (30) located on said pad for energizing the blower and resistance heater;

said power pack comprising a radio receiver tuned to the same frequency as the transmitter for generating an electrical pulse in response to a transmitter signal; a battery; a switch means (40) connected between the battery and the blower-heater unit; said switch means having an "on" position wherein battery current is delivered to the blower-heater unit and an "off" position wherein the blower-heater unit is disconnected from the battery; a pulse-responsive controller connected between the receiver and the switch means for setting the switch means (1) to the "on" position as a response to alternate pulses, and (2) to the "off" position as a response to intervening pulses; a manual switch (60) connected between the battery and the pulse-responsive controller in parallel with the receiver, whereby the controller can be operated by the receiver or by the manual switch; and a battery recharger connected to said battery so that the battery can be periodically recharged by plugging the recharger into a householder electrical outlet;

said deformable pad, blower-heater unit, and power pack being constructed as a single manually movable device installable on the dashboard of a vehicle or removable from the dashboard of a vehicle.

2. A remotely-operated automotive vehicle windshield defrost system comprising:

a blower and electrical resistance heater unit locatable in near proximity to a vehicle windshield for blowing heated air thereagainst;

a portable radio transmitter adapted to be carried by a person remote from the vehicle;

a radio receiver tuned to the same frequency as the transmitter for generating an electrical pulse in response to a transmitter signal; said receiver being locatable within a vehicle in near proximity to the blower-heater unit;

a battery in near proximity to the receiver for delivering operating power thereto;

a switch means (40) connected between the battery and the blower-heater unit; said switch means having an "on" position wherein battery current is delivered to the blower-heater unit, and an "off" position wherein the blower-heater unit is disconnected from the battery; and a pulse-responsive controller connected between the receiver and the switch means for setting the switch means (1) to the "on" position as a response to alternate pulses, and (2) to the "off" position as a response to intervening pulses;

said pulse-responsive controller comprising a coil (38), a pawl-ratchet means (42, 44) indexable by pulses delivered to the coil, and a rotary cam 46 driven by the pawl-ratchet means.

* * * * *